United States Patent
Huang et al.

(10) Patent No.: US 12,174,975 B2
(45) Date of Patent: Dec. 24, 2024

(54) DATABASE MANAGEMENT USING SORT KEYS

(71) Applicant: PayPal, Inc., San Jose, CA (US)

(72) Inventors: Zhe Huang, Shanghai (CN); Haoyang Jia, Shanghai (CN); Renhua Liang, Shanghai (CN); Xin Chen, Shanghai (CN); Ying Yue, Nanjing (CN); Yuliang Zhou, Shanghai (CN); Yao-Tseng Tseng, Shanghai (CN); Pengshan Zhang, Shanghai (CN)

(73) Assignee: PayPal, Inc., San Jose, CA (US)

( * ) Notice: Subject to any disclaimer, the term of this patent is extended or adjusted under 35 U.S.C. 154(b) by 324 days.

(21) Appl. No.: 17/532,013

(22) Filed: Nov. 22, 2021

(65) Prior Publication Data
US 2023/0120186 A1     Apr. 20, 2023

(30) Foreign Application Priority Data

Oct. 20, 2021 (WO) ................ PCT/CN2021/124871

(51) Int. Cl.
*G06F 21/60* (2013.01)
*G06F 16/23* (2019.01)
(Continued)

(52) U.S. Cl.
CPC ........ *G06F 21/604* (2013.01); *G06F 16/2386* (2019.01); *G06F 16/2477* (2019.01); *G06F 16/9024* (2019.01)

(58) Field of Classification Search
CPC ............... G06F 21/604; G06F 16/2386; G06F 16/2477; G06F 16/9024
(Continued)

(56) References Cited

U.S. PATENT DOCUMENTS

| | | | |
|---|---|---|---|
| 6,742,015 B1 * | 5/2004 | Bowman-Amuah | ..... G06F 8/20 718/100 |
| 7,289,964 B1 * | 10/2007 | Bowman-Amuah | ........................ G06F 9/5038 705/1.1 |

(Continued)

FOREIGN PATENT DOCUMENTS

| | | | | |
|---|---|---|---|---|
| CN | 103488704 A | * | 1/2014 | ........... G06F 16/221 |
| CN | 106326361 A | | 1/2017 | |

(Continued)

OTHER PUBLICATIONS

International Search Report and Written Opinion in PCT Appl. No. PCT/CN2021/124871 mailed Jul. 21, 2022, 9 pages.

*Primary Examiner* — Tauqir Hussain
(74) *Attorney, Agent, or Firm* — Kowert, Hood, Munyon, Rankin & Goetzel, P.C.; Catherine L. Gerhardt; Dean M. Munyon (57) ABSTRACT

Techniques are disclosed for storing and retrieving large amounts of data in a non-relational database using sort keys. A server computer system may receive a request for raw data specifying a start timestamp and an end timestamp. The server determines a start key and an end key for performing a query on a distributed non-relational database storing key-value pairs, where the determining is based on the start timestamp and the end timestamp. The server may compare the start key and the end key to a sort key included in row keys of key-value pairs stored in the non-relational database. Based on the comparing, the server retrieves one or more rows of raw data from the non-relational database. The server generates a graphical representation of the one or more rows of raw data retrieved from the non-relational database. The disclosed techniques may advantageously improve the efficiency of a database management system.

20 Claims, 8 Drawing Sheets

(51) Int. Cl.
*G06F 16/2458* (2019.01)
*G06F 16/901* (2019.01)

(58) Field of Classification Search
USPC .......................................................... 726/26
See application file for complete search history.

(56) References Cited

U.S. PATENT DOCUMENTS

| | | | | |
|---|---|---|---|---|
| 8,909,681 | B2* | 12/2014 | Spalten | G06F 16/2477 707/803 |
| 9,400,817 | B2* | 7/2016 | Wildermuth | G06F 16/2272 |
| 10,127,955 | B2* | 11/2018 | Xiao | G06F 3/0659 |
| 10,262,025 | B2* | 4/2019 | Iyer | G06F 16/2365 |
| 10,496,768 | B2 | 12/2019 | Zhang et al. | |
| 10,776,346 | B2* | 9/2020 | Bangalore Ananthakumar | G06F 16/2282 |
| 11,068,384 | B2 | 7/2021 | Zhang et al. | |
| 11,609,933 | B1* | 3/2023 | Ozen | G06F 16/2477 |
| 11,836,249 | B2* | 12/2023 | Yu | G06F 21/554 |
| 11,860,835 | B1* | 1/2024 | Vig | G06F 16/2365 |
| 2013/0091112 | A1* | 4/2013 | Iyer | G06F 16/284 707/E17.049 |
| 2014/0263623 | A1* | 9/2014 | Robison | G06Q 20/204 235/380 |
| 2018/0060341 | A1 | 3/2018 | Wu et al. | |
| 2018/0307735 | A1* | 10/2018 | Thayer | G06F 16/211 |
| 2019/0155795 | A1* | 5/2019 | Xiao | G06F 9/526 |
| 2019/0305932 | A1* | 10/2019 | Townsend | H04L 9/0637 |
| 2019/0392065 | A1* | 12/2019 | Bangalore Ananthakumar | G06F 16/2228 |
| 2020/0074853 | A1* | 3/2020 | Miller | G08G 1/012 |
| 2020/0089798 | A1* | 3/2020 | Ganichot | G06F 16/254 |
| 2020/0142897 | A1* | 5/2020 | Qian | G06N 20/00 |
| 2020/0142987 | A1* | 5/2020 | Grabs | G06F 16/2379 |
| 2020/0210228 | A1 | 7/2020 | Wu et al. | |
| 2020/0409931 | A1 | 12/2020 | Zang et al. | |
| 2020/0409932 | A1* | 12/2020 | Weizman | H04L 9/0861 |
| 2024/0127203 | A1* | 4/2024 | Kagiwada | G06Q 20/102 |

FOREIGN PATENT DOCUMENTS

| | | |
|---|---|---|
| CN | 109829015 A | 5/2019 |
| CN | 110427438 A | 11/2019 |
| WO | 2021120000 A1 | 6/2021 |
| WO | 2021134432 A1 | 7/2021 |

* cited by examiner

Method
700

Receive, from a computing device, a request for raw data specifying a start timestamp and an end timestamp.
710

Determine a start key and an end key for performing a query on a distributed non-relational database storing key-value pairs, where the determining is based on the start timestamp and the end timestamp.
720

Compare the start key and the end key to a sort key included in row keys of key-value pairs stored in the non-relational database.
730

Retrieve, based on the comparing, one or more rows of raw data from the non-relational database.
740

Generate a graphical representation of the one or more rows of raw data retrieved from the non-relational database.
750

DATABASE MANAGEMENT USING SORT KEYS

PRIORITY CLAIM

The present application claims priority to PCT Appl. No. PCT/CN2021/124871, filed Oct. 20, 2021, which is incorporated by reference herein in its entirety.

BACKGROUND

Technical Field

This disclosure relates generally to data management, and, more specifically, to techniques for maintaining and retrieving data stored in a non-relational database e.g., based on sort keys.

Description of the Related Art

As more and more transactions are conducted electronically via online transaction processing systems, for example, these processing systems become more robust in managing transaction data as well as detecting suspicious and unusual behavior. Many transaction requests for a computer system may be malicious in intent, resulting in wasted computer resources, network bandwidth, storage, CPU processing, etc., if those transactions are processed. Some transaction processing systems attempt to analyze various transaction data for previously processed and currently initiated transactions to identify and mitigate malicious behavior such as requests for fraudulent transactions.

DETAILED DESCRIPTION

As the processing bandwidth of different entities increases, retrieving and manipulating data for such entities (e.g., to generate a summary of the data, to perform various data analytics processes on the data, etc.) becomes increasingly time and resource-intensive. For example, some entities may be associated with billions of completed transactions, with millions of new transactions being processed on a monthly, weekly, daily, etc. basis. As one specific example, a transaction processing system (e.g., PayPal™) may process transactions for multiple different clients. In this specific example, a given client may initiate transactions with millions of different users per day. In some situations, the slow retrieval of transaction data may lead to a poor user experience e.g., when transaction data is being retrieved to generate a statistical report (such as a graphical depiction of transaction data) for the entity associated with the retrieved transactions.

The disclosed techniques execute a database management system that implements sort keys when storing and retrieving data from a database. In particular, the database management system stores transactions using sort keys that include timestamps corresponding to a time at which the transactions were created. In addition, the disclosed techniques store transaction data in a non-relational database providing distributed, scalable, big data storage. As one specific example, the disclosed database management system may utilize an Apache Hbase™ datastore. As such, a row within the database stores transaction data for a given transaction and the row keys of each row include a sender identifier (ID), a direction of transaction flow (e.g., which entity is the receiver and which entity is the sender in a transaction), a transaction initiation timestamp (i.e., the sort key), a receiver ID, and a transaction ID.

In disclosed techniques, raw data is received and stored in a non-relational database as key-value pairs. For example, in order to store transaction data in a non-relational database, the transaction data is horizontally partitioned by sort key and stored in different regions of a non-relational database managed by a plurality of region servers. For example, a first set of rows of raw transaction data corresponding to a first range of transaction initiation timestamps (sort keys) are stored in a first region, while a second set of rows of the raw transaction data corresponding to a second range of transaction initiation timestamps (sort keys) are stored in a second region. The different regions within the non-relational database are managed by different region servers of the database management system. A given region server may manage multiple database regions. The disclosed non-relational database may horizontally partition a plurality of different rows of transaction data across multiple regions, including the following types of transaction data tables: transaction table, linking table, account table, etc.

The disclosed techniques may advantageously provide for quick and efficient retrieval of large amounts of transaction data based on sort keys including transaction initiation times. In addition, the disclosed techniques provide continuous and efficient updates to stored transaction data as transactions are initiated over time without decreasing the performance of queries made on the non-relational database storing the transaction data. The efficient querying provided by disclosed techniques may, in turn, advantageously allow transaction processing systems to quickly analyze transaction data to identify suspicious behavior and, thereby, mitigate potential future fraudulent behavior. Such techniques may advantageously decrease the amount of computer resources necessary to perform such queries as well as decreasing loss (e.g., financial, user trust, etc.) associated with fraudulent transactions.

Example Database Management System

Figure 1:
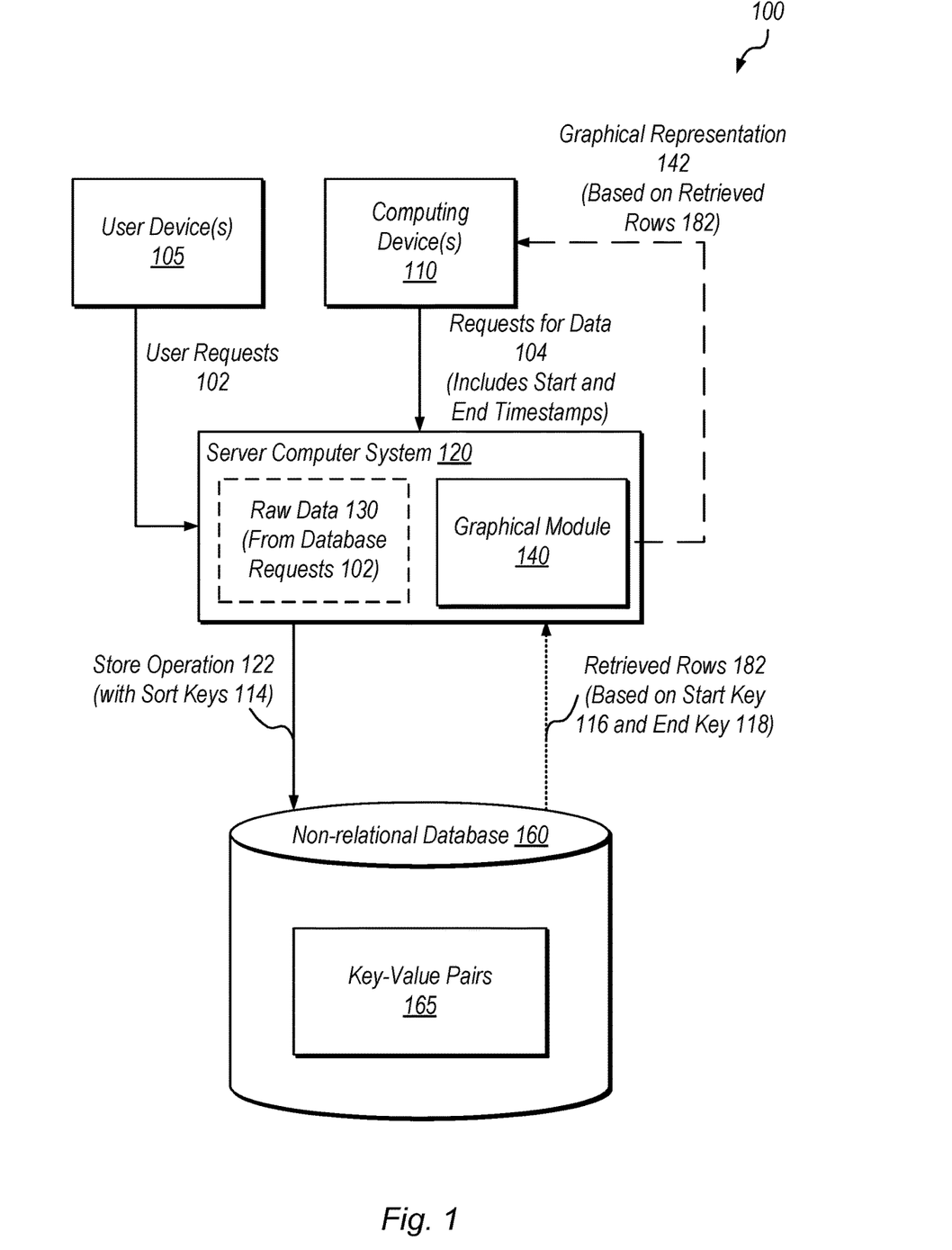
FIG. 1 is a block diagram illustrating an example system configured to store and manipulate raw data in a non-relational database using sort keys, according to some embodiments.

FIG. 1 is a block diagram illustrating an example system configured to store and manipulate raw data in a non-relational database using sort keys. In the illustrated embodiment, system 100 includes a non-relational database 160, one or more user devices 105, one or more computing devices 110, and a server computer system 120, which in turn includes a graphical module 140 and raw data 130 (generated based on user requests 102).

In the illustrated embodiment, server computer system 120 receives user requests 102 from one or more user devices 105. In some embodiments, user requests 102 include requests from various users of server computer system 120 to process transactions. For example, server computer system 120 may be a transaction processing system (e.g., PayPal™) configured to process transactions requested by various users of user devices 105. In such situations, user devices 105 belong to individual users e.g., that have accounts with the transaction processing system and utilize transaction services provided by such a system. In some embodiments, a system other than server computer system 120 receives user requests 102 from various user devices 105 and stores raw data 130 generated based on requests 102 (e.g., transaction, account, linking data) in non-relational database 160. For example, server computer system 120 may simply retrieve data from non-relational database 160 while another system other than system 120 stores and maintains data within database 160 based on user requests 102. As one specific example, a user request may be a request to set up an account. In this example, the other system stores data for this newly set up account in database 160. Further in this example, system 120 is able to retrieve the data for the newly set up account from database 160 for use in generating a graphical representation 142.

Based on user requests 102, server computer system 120 performs one or more create, read, update, delete (CRUD) operations on non-relational database 160. In the illustrated embodiment, system 120 performs various store operations 122 to store raw data 130 generated based on user requests 102 in rows of non-relational database 160 as key-value pairs 165. For example, system 120 may store transaction, account, or linking data in non-relational database 160 based on transaction requests and account requests (e.g., open a new user account) received from one or more user devices 105. In some embodiments, server computer system 120 performs a bulk update and insert (upsert) operation to store a large set of data in database 160. System 120 stores raw data 130 by including sort keys 114 for the raw data 130 in the row keys of key-value pairs 165 of non-relational database 160. A sort key included in a given row key is a timestamp at which data stored in a given row of non-relational database 160 was generated. As one specific example, when the given row of the database 160 stores data for a transaction, the sort key is a timestamp at which the transaction was initiated.

Server computer system 120, in the illustrated embodiment, also receives requests 104 for raw data from one or more computing devices 110. The one or more computing devices 110 correspond to one or more developers of server computer system 120. For example, a developer computing device may monitor suspicious behavior and prevent fraudulent activity. In such situations, requests 104 received from computing device(s) 110 include requests for transaction data, account data, linking data, etc. to determine whether activity summarized e.g., in a graphical representation 142 indicates that various transaction activity is suspicious (and potentially fraudulent). User(s) of computing device(s) 110 may utilize various development tools to process data obtained via requests 104 from server computer system 120. As one specific example, internal PayPal™ development tools utilized by fraud agents may include Milkyway Studio, Galaxi service (a web user interface tool used to display graphical data received from system 120), etc. As one specific example, Galaxi service may be executed to illustrate the graphical representation generated by server computer system 120 from data retrieved from non-relational database 160.

Figure 3:
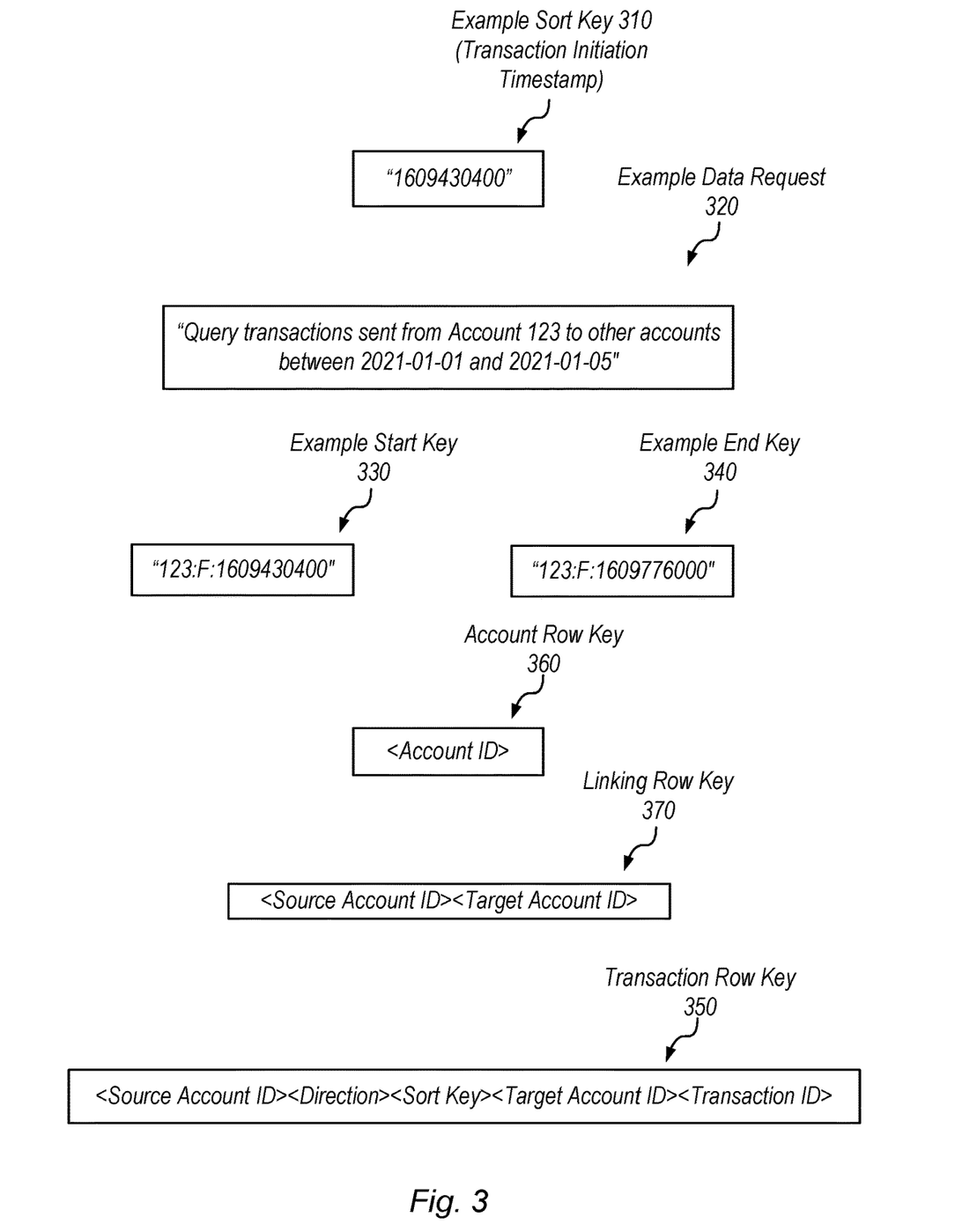
FIG. 3 is a diagram illustrating example database keys and an example data request, according to some embodiments.

Requests 104 received from one or more computing devices 110 include both a start timestamp and an end timestamp, indicating an interval of time corresponding to the data being requested. Based on the requests 104 for raw data, server computer system 120 may determine a start key 116 and an end key 118. For example, server computer system 120 may generate a start key that includes a start timestamp included in one of requests 104 and an end key that includes the end timestamp included in one of requests 104. FIG. 3 described below includes details for start and end keys. Based on the start key 116 and end key 118, server computer system 120 may retrieve one or more rows 182, including key-value pairs 165, from non-relational database 160. For example, server computer system 120 compares the start key 116 and the end key 118 to a sort key (transaction initiation timestamp) included in row keys of key-value pairs stored in non-relational database 160.

In some embodiments, after obtaining retrieved rows 182, server computer system 120, generates, via graphical module 140, a graphical representation 142 of rows 182 retrieved for a particular computing device 110 based on a given request 104 for data from the particular computing device 110. As one specific example, retrieved rows 182 may include transaction data and the graphical representation 142 may illustrate transaction statistics e.g., for identifying suspicious (and ultimately fraudulent) trends in the transaction data. In some embodiments, server computer system 120 sends graphical representation 142 to the particular computing device 110 based on the given request 104. In other embodiments, server computer system 120 performs an analysis of the graphical representation 142. In such situations, server computer system 120 may perform one or more actions based on analyzing the graphical representation 142 (e.g., fraud prevention, such as blocking a user account associated with suspicious transactions included in graphical representation 142, increasing authentication requirements for the user account, etc.). For example, the graphical representation is usable by the particular computing device to determine whether to alter one or more account parameters for one or more accounts corresponding to rows of raw data stored in database 160 and used to generate graphical representation 142. Graphical representation 142, for example, may indicate suspicious behavior associated with a given user account.

In some embodiments, non-relational database 160 is a distributed, scalable database. For example, database 160 may include a plurality of different database regions (instances) maintained by a plurality of region servers. In some situations, the region servers are geographically distributed (e.g., a first region server is located in North America and a second region server is located in South America). As one specific example, non-relational database 160 may be an Apache Hbase™ datastore. Due to its ability to store data across multiple different regions, non-relational database 160 is able to store billions of rows of data and, thus, may be utilized in big data scenarios. The database regions that may be included in database 160 are a contiguous, sorted range of rows that are stored together. Billions of rows of data may be split into hundreds, thousands, millions, etc. of regions. The database regions may be distributed evenly among various region servers. A single region server may maintain multiple database regions, as shown and discussed below with reference to FIG. 4.

In this disclosure, a "module" operable to perform designated functions are shown in the figures and described in detail (e.g., graphical module 140). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Example Raw Data

Figure 2:
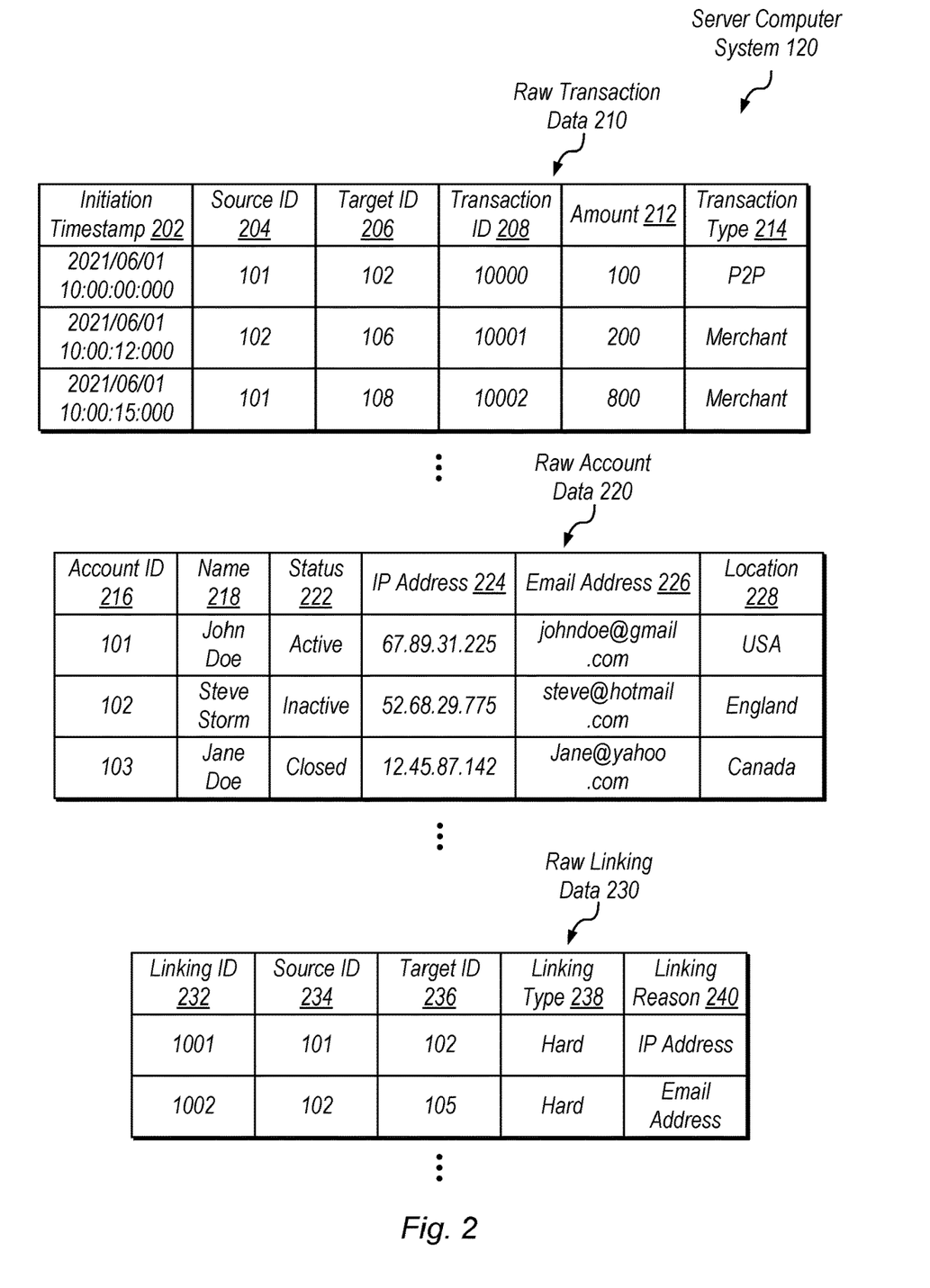
FIG. 2 is a diagram illustrating example raw data, according to some embodiments.

Turning now to FIG. 2, a block diagram is shown illustrating example raw data. In the illustrated embodiment, example raw data for transactions, accounts, and linkings that may be received by server computer system 120 from one or more user devices 105 is shown. In the illustrated embodiment, table 210 includes various raw transaction data, table 220 includes various raw account data, and table 230 includes various raw linking data.

Table 210, in the illustrated embodiment, includes the following columns for raw transaction data: initiation timestamp 202, source ID 204, target ID 206, transaction ID 208, amount 212, and transaction type 214. For example, the first row of table 210 includes data for a particular transaction that was initiated at 2021/06/01 10:00:00:000 (initiation timestamp 202), from a source account having the identifier "101" for a target account having the identifier of "102." In this example, the particular transaction that has an identifier of "10000," is for the amount 212 of "100" (e.g., US dollars), and is a person-to-person (P2P) transaction (transaction type 214). Although only three example rows of raw transaction data are shown in table 210, any of various numbers of rows of transaction data may be included in this table.

Table 220, in the illustrated embodiment, includes the following columns for raw account data: customer ID 216, name 218, status 222, IP address 224, email address 226, and location 228. For example, the first row of table 220 includes data for a particular account, corresponding to account ID "101," user name "John Doe," account status "Active," IP address "67.89.31.225," email address johndoe@gmail.com, and located in the USA. Although example account data is shown for only three different accounts, table 220 may include any of various numbers of rows including raw data for different accounts.

Table 230, in the illustrated embodiment, includes the following columns for raw linking data: linking ID 232, source ID 234, target ID 236, linking type 238, and linking reason 240. For example, the rows of table 230 include data for different known links between two different accounts. The first row of table 230, for example, includes linking ID 232 for a particular linking between a source account with identifier "101" and a target account with identifier "102," with a linking type 238 of "hard," and a linking reason 240 of "IP address." In this particular example, accounts 101 and 102 are linked (e.g., known to be related in some way) based on their IP addresses. That is, these two accounts share an IP address and, thus may have been created by the same user.

In some embodiments, a system administrator manually generates pre-defined rules for linking accounts. Based on the pre-defined rules, the disclosed system (e.g., server computer system 120 or another computer system) generates linkings (e.g., the linkings included in table 230) between various accounts. For example, two accounts may be linked based on these accounts sharing an email address, device ID, IP address, geographic location, etc. Linking may be useful in identifying suspicious transaction behavior. For example, a user may generate multiple different accounts and may use these different accounts to initiate multiple transactions. If these transactions are identified as being initiated from linked accounts, it will be easier for a system admin, security analyst, etc. to identify patterns of suspicious behavior emanating from these two accounts (e.g., that these transactions are fraudulent).

Example Database Keys

FIG. 3 is a block diagram illustrating example database keys and an example data request. In the illustrated embodiment, examples of a sort key 310, data request 320, start key 330, end key 340, account row key 360, linking row key 370, and transaction row key 350 are shown.

The example sort key 310 shown in FIG. 3 is a transaction timestamp "1609430400" (UNIX timestamp) for a particular transaction initiated on 2021-01-01 (represented using the YYYY-MM-DD date format). In some embodiments, transaction timestamps include an hour, minute, and second time corresponding to a time at which this transaction was initiated. For example, the initiation timestamps 202 shown in table 210 of FIG. 2 show transaction initiation timestamps with a date as well as hour, minute, second, and millisecond initiation times.

Example data request 320 shows a request sent by a computing device 110 to server computer system 120 requesting transaction data for transactions initiated from Account123 between 2021-01-01 and 2021-01-05. For example, request 320 specifies to "query transactions sent from Account 123 to other accounts between 2021-01-01 and 2021-01-05."

Example start key 330 includes an account number "123," a direction for the transaction "F" (forward), and a start UNIX timestamp of "16094304000." Similarly, example end key 340 includes an account number "123," a direction for the transaction "F" (forward), and an end UNIX timestamp of "1609776000." Thus, start key 330 and end key 340 will be used by server computer system 120 to query database 160 to retrieve all transactions stored in the database that were initiated between timestamps "16094304000" and "1609776000" from account 123 to one or more other accounts.

Specific examples of row keys for transactions, accounts, and linkings are described below with reference to FIG. 4. The row keys 360, 370, and 350 shown in FIG. 3 are not specific examples of row keys, but rather show the types of variables that are included in these keys. Account row keys 360, for example, will include only account identifiers corresponding to respective accounts storing account data within database 160. Linking row keys 370 will include two account identifiers of two different accounts that have been identified as linked in some way. Two different versions of a linking between two accounts may be stored. For example, a linking for accounts 101 and 102 may be stored as the following two rows: <101><102> and <102><101>. Transaction row key 350 includes a source account ID, a direction of transaction flow (e.g., which account is the receiver and which account is the sender in a transaction), a sort key (a transaction initiation timestamp), a target account ID, and a transaction ID. For example, each row within database 160 storing data for a transaction will also store a transaction row key with the types of transaction information shown in transaction row key 350 of FIG. 3.

Example Database System

Figure 4:
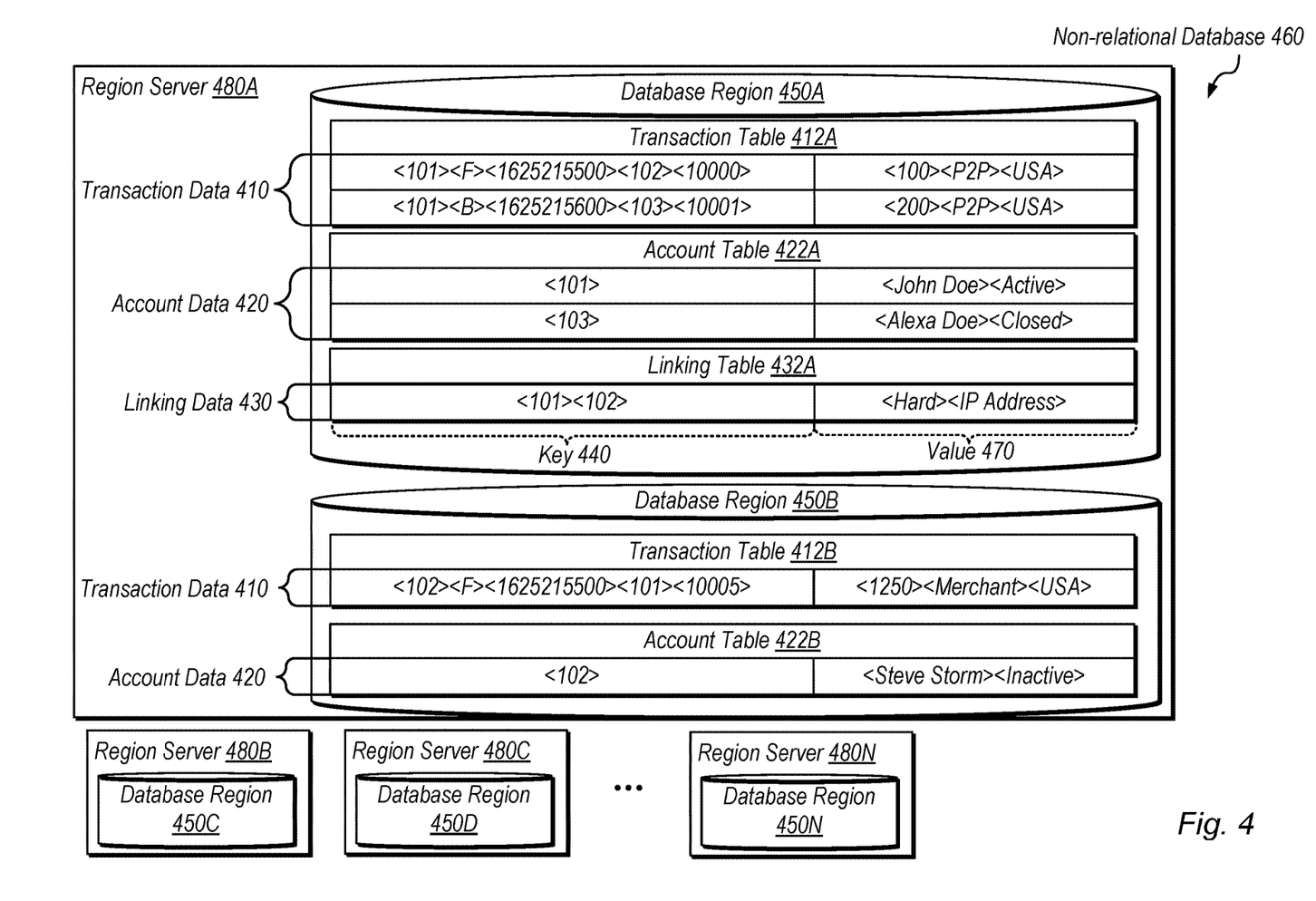
FIG. 4 is a block diagram illustrating an example non-relational database, according to some embodiments.

Turning now to FIG. 4, a diagram is shown illustrating an example non-relational database 460. The non-relational database 460 shown in FIG. 4 is one example of non-relational database 160 discussed above with reference to FIG. 1. In the illustrated embodiment, non-relational database 460 includes various region servers 480A-480N hosting various database regions 450A-450N.

Region servers 480 are located in a single data central within a given geographic location. For example, region servers 480 may be built as Apache Hbase™ clusters. In some situations, region servers 480 may be located in different geographic locations. For example, region server 480A may be located in North America, while region server 480B may be located in South America. Region server 480A, in the illustrated embodiment, hosts database regions 450A and 450B, storing transaction data 410, account data 420, and linking data 430 as various key-value pairs.

In the illustrated embodiment, database region 450A includes three types of tables: transaction tables 412 storing transaction data 410 in the form of key-value pairs, account tables 422 storing account data 420 in the form of key-value pairs, and linking tables 432 (although linking tables 432B, 432C, etc., for example, are not shown, any of various numbers of linking tables may be stored in different database regions 450 maintained by various database server 480). The transaction data 410, account data 420, and linking data 430 is stored using respective keys 440 and values 470. Transaction table 412A stores data for two different transactions, account table 422A stores data for two different accounts, and linking table 432A stores data for a single linking. The key 440 for the first transaction in table 412A includes the source account ID "101," the transaction direction "F" (forward), the UNIX timestamp "1625215500," the destination account ID "102," and the transaction ID "10000." The key 440 for the account data stored in account table 422A of database region 450A includes the account ID "101," while the value 470 for the account data stored in the third row includes an account name "John Doe" (e.g., the user associated with account 101), and an account status of "Active." Database region 450B, in the illustrated embodiment, stores transaction data 410 in transaction table 412B and account data 420 for in account table 422B for account 102.

Although a limited number of key-value pairs are shown in the tables of each of database regions 450A and 450B, note that any of various numbers of rows of data may be stored in each of these database regions (as well as database regions 450C-450N). In some embodiments, each database region 450 includes the same amount of storage space. For example, both database region 450A and database region 450B may store 1 GB. In other embodiments, each database region 450 includes a different amount of storage space. As one specific example, database region 450A might store up to 1 GB of data, while database region 450B might store up to 2 GB of data.

In some embodiments, server computer system 120 stores two copies of each row of transaction data with switched source and target identifiers. For example, server computer system 120 may store the transaction shown in the first row of transaction table 412A in database region 450A first with the following key 440: "<101><F><1625215500><102><10000>." Further in this example, server computer system 120 may also store the same transaction with the following key 440 (with the source account identifier 101 and target account identifier 102 switched): "<102><F><1625215500><101><10000>." Thus, it is possible to query database 460 via either vertex (either of the two entities) of a transaction. In this example, clients of server computer system 120 may query database 460 by specifying account 101 as the "sender" account or may query database by specifying account 102 as the "receiver" account. As one specific example, a database query may request all transactions that are initiated from account 101 and sent to various other accounts between two different timestamps (i.e., start and end timestamps). As another specific example, a database query may request all transactions that are received at account 102 from any of various other accounts between two different timestamps.

In situations in which a client of server computer system 120 requests transaction data by specifying a single account as both the source account and the destination account, server computers system 120 splits such a client request into two different database get operations. For example, a client request to query all transactions that are sent by account 101 and received by account 101 between 2021-01-01 (UNIX timestamp: 1609430400) to 2021-01-05 (UNIX timestamp: 1609776000) will be split up into the following two queries: (1) all transactions sent by account 101 with a start key of "101:1:1609430400" and end key="101:1:1609776000" and (2) all transactions received by account 101 with start key of "101:2:1609430400 and end key of "101:2: 1609776000." In some situations, the direction of a transaction (forward or backward) may be specified using a binary representation of "1" meaning forward and "2" meaning backward. The start key discussed in the example above is "101:1:1609430400," with "101" being the source or destination account ID, "1" being the transaction direction is forward (meaning that we are searching for transactions initiated at account 101 and sent to other accounts), and a UNIX timestamp of 1609430400 specifying where to begin searching for transactions within database 460.

Clients of server computer system 120 can query account data 420 by including an account identifier in their database requests. Unlike requests for transaction data 410 (such as requests 104 shown in FIG. 1), requests for account data 420 do not include start and end timestamps. As one specific example, a client computing device (e.g., a computing device 110) may request account data for account identifiers 101, 102, and 103. In this specific example, the client request will be translated by server computer system 120 into three different get operations for querying database 460 to retrieve data for these three accounts.

Clients of server computer system 120 might query linking data 430 by including an account identifier in their database requests. For example, a given request for linking data 430 might specify the following account identifiers 101, 102, and 103. Based on this request, server computer system 120 generates three different get operations to retrieve all available linkings for each of the three accounts specified in the request. For example, server computer system 120 may return the following information for the request specifying account IDs 101, 102, and 103: (1) account 101 is linked to accounts 103, 105, and 106, (2) account 102 is linked to account 101, and 103, and (3) account 103 is linked to account 101, 102, 104, and 105.

Example Linking

Figure 5:
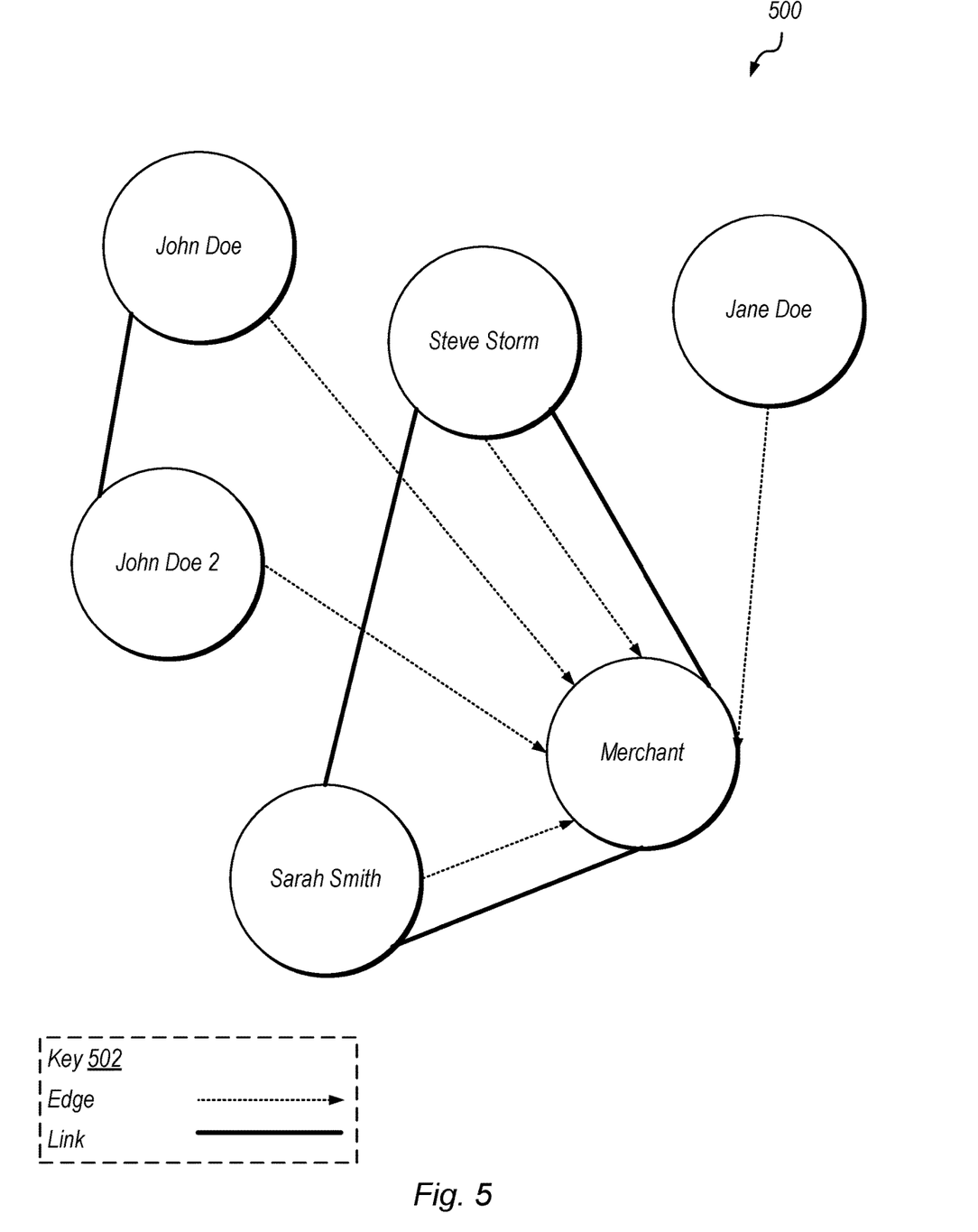
FIG. 5 is a diagram illustrating a graphical representation of linking, according to some embodiments.

FIG. 5 is a diagram illustrating a graphical representation of linking. In the illustrated embodiment, example graphical representation 500 shows six different accounts including links between several of the accounts. For example, the account named "John Doe" is linked to the account named "John Doe 2". Similarly, the account belonging to "Steve Storm" is linked to the accounts belonging to "Sarah Smith" and "Merchant," respectively. The account belonging to "Sarah Smith" is linked to the account belonging to "Merchant." As indicated by key 502, in the illustrated embodiment, the dotted lines with arrows within FIG. 5 represent transactions or "edges" occurring between various linked and non-linked accounts included within the example graphical representation 500.

Figure 6:
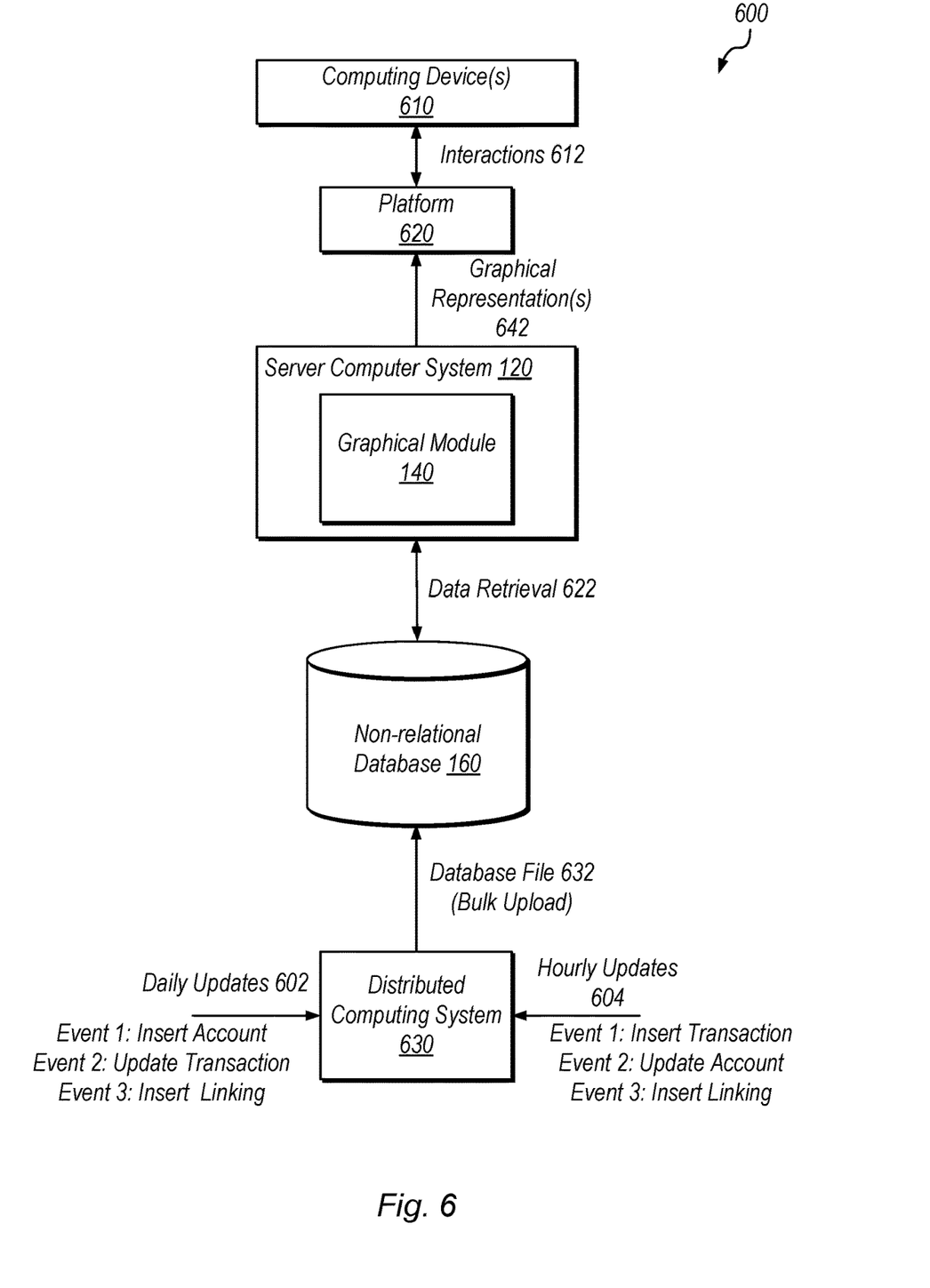
FIG. 6 is a block diagram illustrating an example database file upload, according to some embodiments.

FIG. 6 is a block diagram illustrating an example database file upload. In the illustrated embodiment, system 600 includes a computing device 610, platform 620, server computer system 120, non-relational database 160, and distributed computing system 630. Distributed computing system may be executed as an Apache Hadoop™ cluster, for example.

Distributed computing system 630, in the illustrated embodiment, receives daily updates 602 and hourly updates 604 e.g., from server computer system 120 (based on this system 120 receiving requests from user devices 105, for example). In some situations, system 630 may receive millions of new transactions, new linkings, account status changes, deleted linkings, etc. during the daily updates 602 or hourly updates 604.

Based on receiving updates 602 and 604, computing system 630 stores a database file 632 in non-relational database 160 via a bulk upload operation. For example, computing system 630 may perform an upsert of millions of transactions in database 160 via a bulk upload operation to upload a single file to database 160. As one specific example, computing system 630 may be an Apache Hbase™ server that provides a bulk upload functionality to prepare data offline and load this data directly to non-relational database 160 without impacting live queries to database 160 (instead of uploading and inserting records in the database one at a time, which may impact queries). In this specific example, the bulk upload of data is referred to as an Hfile. In some embodiments, computing system 630 may be executed via Apache Hadoop™. In some embodiments, computing system 630 and server computer system 120 are the same server.

Server computer system 120, in the illustrated embodiment, performs a data retrieval 622 to retrieve data from non-relational database 160. System 120 may perform periodic data retrievals 622 of data from database 160 (e.g., the retrievals may correspond to the database file 632 bulk uploads). Using the retrieved data, server computer system 120 via graphical module 140 generates one or more graphical representations 642. For example, based on the data retrieved from database 160, system 120 may generate a statistical aggregation of the transaction data retrieved as part of database file 632.

Platform 620, in the illustrated embodiment, receives one or more graphical representations from server computer system 120. In the illustrated embodiment, one or more computing devices 610 interact 612 with platform 620. For example, as discussed above with reference to FIG. 1, platform 620 may be an internal service of PayPal™, such as Galaxi services or Milkyway Studio, that provide graphical illustrations to computing devices 610 for display to users of these devices (e.g., developers may view graphical representations 642 of transaction data in order to identify suspicious behavior). In some embodiments, application programming interfaces (APIs) (e.g., a PayPal™ Platform-as-a-service (PaaS) provide for communication between one or more services.

Example Method

Figure 7:
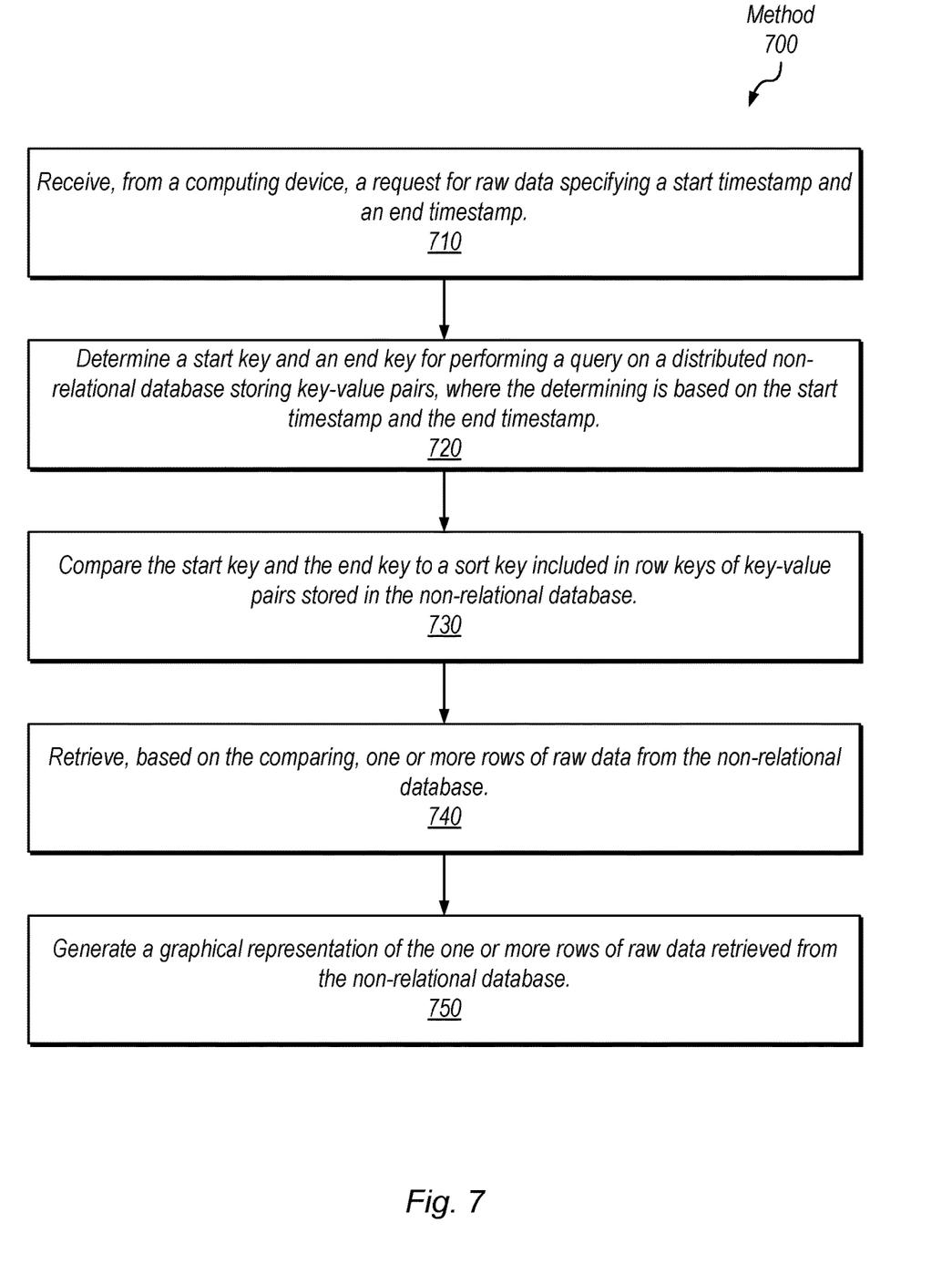
FIG. 7 is a flow diagram illustrating a method for generating a graphical representation of raw data retrieved from a non-relational database using sort keys, according to some embodiments.

FIG. 7 is a flow diagram illustrating a method 700 for generating a graphical representation of raw data retrieved from a non-relational database using sort keys, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, server computer system 120 performs the elements of method 700.

At 710, in the illustrated embodiment, a server computer system receives, from a computing device, a request for raw data specifying a start timestamp and an end timestamp. In some embodiments, the request for raw data further specifies at least one account identifier, where determining the start key and the end key for searching the non-relational database is further based on the at least one account identifier. In some embodiments, the raw data stored in the non-relational database includes one or more types of the following types of raw data: transaction, account, and linking.

At 720, the server computer system determines a start key and an end key for performing a query on a distributed non-relational database storing key-value pairs, where the determining is based on the start timestamp and the end timestamp. For example, the non-relational database stores transaction data, account data, and linking data in various rows of a database region, where the rows of the database region include key-value pairs.

At 730, a server computer system compares the start key and the end key to a sort key included in row keys of key-value pairs stored in the non-relational database. In some embodiments, the sort keys included in row keys of key-value pairs include transaction initiation timestamps, where row keys of key-value pairs storing raw data for transactions in the non-relational database include a source account identifier, a transaction direction, a target account identifier, and a transaction identifier. As one specific example, a row key of a key-value pair storing data for a particular transaction may include the following information: <102><F><1625215500><101><10008>.

In some embodiments, row keys of rows storing raw data for accounts in the non-relational database include an account identifier, where row keys of rows storing raw linking data in the non-relational database include two account identifiers. As one specific example, a first account ID may be the account number "101" for a first account and a second account ID may be the account number "106" for a second, different account.

At 740, the server computer system retrieves, based on the comparing, one or more rows of raw data from the non-relational database. In some embodiments, the server computer system periodically performs, without interrupting current requests for raw data stored in the non-relational database from one or more computing devices, a bulk upsert of raw data, wherein the bulk upsert includes changes to one or more types of the following types of raw data: transaction, account, and linking. As one specific example, the database may store batches of raw transaction, account, and linking data in Apache Hbase™ via Hfiles every hour, day, week, etc. based on transaction requests from multiple different user accounts, changes to different user accounts, newly identified linkings between two or more accounts, etc. In some embodiments, the bulk upsert is performed on an hourly basis. In some embodiments, the bulk upsert is performed on a daily basis.

In some embodiments, periodically performing the bulk upsert of raw data in the non-relational database includes generating a duplicate set of transactions from a set of initiated transactions included in the raw data. In some embodiments, periodically performing the bulk upsert of raw data in the non-relational database includes altering the duplicate set of transactions by switching a source account identifier and a target account identifier associated with respective transactions in the duplicate set of transactions.

At 750, the server computer system generates a graphical representation of the one or more rows of raw data retrieved from the non-relational database. In some embodiments, the server computer system transmits, to the computing device, the graphical representation, where the graphical representation is usable by the computing device to determine whether to alter account parameters for one or more accounts corresponding to the one or more rows of raw data used to generate the graphical representation. In some embodiments, the transmitting further includes sending instructions specifying one or more changes to be made to one or more accounts corresponding to the one or more rows of raw data used to generate the graphical representation. For example, the instructions may indicate to restrict certain accounts that appear to be suspicious according to the graphical representation.

In some embodiments, the server computer system performs some action based on the generated graphical representation. For example, server computer system may restrict a user account in some way, including limiting the user account's access to various information, increasing the number of authentication factors required for this account to complete a transaction, decreasing permissions for the user account, etc. These restrictions may be based on the graphical representation indicating the user account is suspicious or even fraudulent.

Example Computing Device

Figure 8:
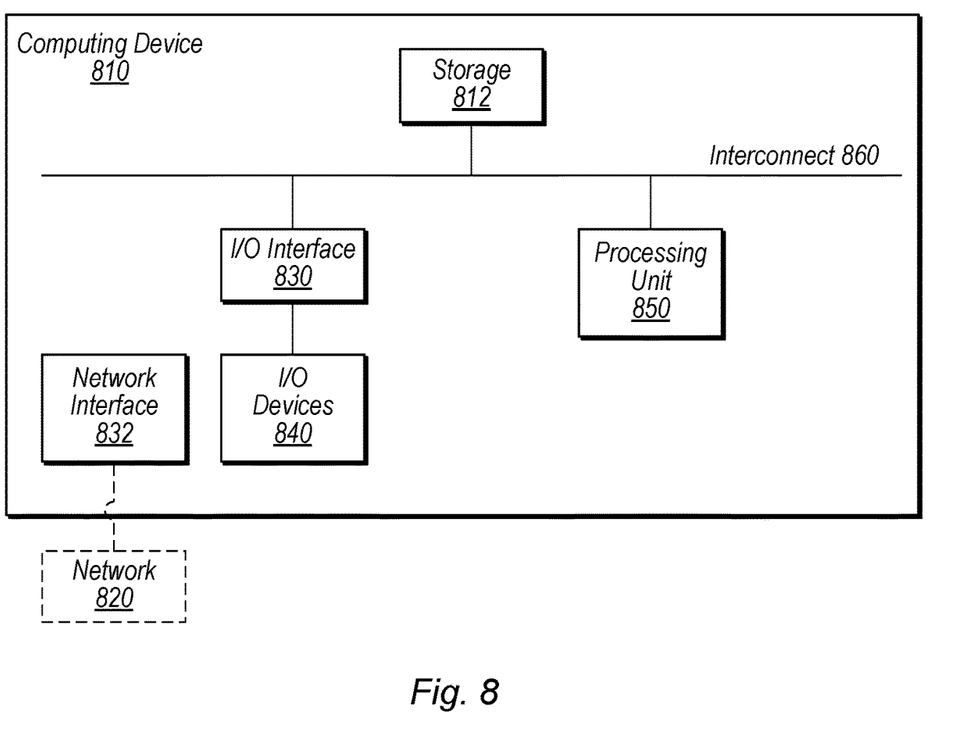
FIG. 8 is a block diagram illustrating an example computing device, according to some embodiments.

Turning now to FIG. 8, a block diagram of one embodiment of computing device 810 (which may also be referred to as a computing system) is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. The server computing system 120 shown in FIG. 1 and discussed above is one example of computing device 810. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory, in one embodiment. Non-relational database 160, discussed above with reference to FIG. 1 is one example of storage subsystem 812. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
    receiving, by a server computer system from a computing device, a request for raw data specifying a start timestamp and an end timestamp;
    determining, by the server computer system, a start key and an end key for performing a query on a distributed non-relational database storing key-value pairs, wherein the determining is based on the start timestamp and the end timestamp;
    comparing, by the server computer system, the start key and the end key to a sort key included in row keys of the key-value pairs stored in the non-relational database;
    retrieving, by the server computer system based on the comparing, one or more rows of raw data from the non-relational database;
    generating, by the server computer system, a graphical representation of the one or more rows of raw data retrieved from the non-relational database; and
    periodically performing, by the server computer system, a bulk update of the raw data, wherein the bulk update includes altering a duplicate set of transactions included in the raw data by switching a source account identifier and a target account identifier associated with respective transactions in the duplicate set of transactions.

2. The method of claim 1, wherein sort keys included in the row keys of the key-value pairs include transaction initiation timestamps, and wherein the row keys of the key-value pairs storing raw data for transactions in the non-relational database include a source account identifier, a transaction direction, a target account identifier, and a transaction identifier.

3. The method of claim 1, wherein row keys of rows storing raw data for accounts in the non-relational database include an account identifier, and wherein row keys of rows storing raw linking data in the non-relational database include a source account identifier and a target account identifier.

4. The method of claim 1, wherein the server computer system performs the bulk update without interrupting current requests for raw data stored in the non-relational database from one or more computing devices, wherein the bulk update includes changes to one or more types of the following types of raw data: transaction, account, and linking.

5. The method of claim 4, wherein the bulk update is performed on an hourly basis.

6. The method of claim 4, wherein periodically performing the bulk update of the raw data in the non-relational database includes:
    generating a duplicate set of transactions from a set of initiated transactions included in the raw data.

7. The method of claim 1, wherein the request for raw data further specifies at least one account identifier, and wherein determining the start key and the end key for searching the non-relational database is further based on the at least one account identifier.

8. The method of claim 1, further comprising:
    transmitting, by the server computer system to the computing device, the graphical representation, wherein the graphical representation is usable by the computing device to determine whether to alter account parameters for one or more accounts corresponding to the one or more rows of raw data used to generate the graphical representation.

9. The method of claim 8, wherein the transmitting further includes sending instructions specifying one or more changes to be made to one or more accounts corresponding to the one or more rows of raw data used to generate the graphical representation.

10. A non-transitory computer-readable medium having instructions stored thereon that are executable by a server computer device to perform operations comprising:
    receiving, from a computing device, a request for raw data specifying a start timestamp and an end timestamp;
    determining a start key and an end key for performing a query on a distributed non-relational database storing key-value pairs in a plurality of database regions managed by one or more region servers, wherein the determining is based on the start timestamp and the end timestamp;
    comparing the start key and the end key to a sort key included in row keys of key-value pairs stored in the non-relational database;
    retrieving, based on the comparing, one or more rows of raw data from the non-relational database;
    generating a graphical representation of the one or more rows of raw data retrieved from the non-relational database; and
    performing a bulk upsert of the raw data, wherein the bulk upsert includes altering a duplicate set of records included in the raw data by switching a source entity identifier and a target entity identifier associated with respective records in the duplicate set of records.

11. The non-transitory computer-readable medium of claim 10, wherein sort keys included in the row keys of the key-value pairs include transaction initiation timestamps.

12. The non-transitory computer-readable medium of claim 10, wherein row keys of key-value pairs storing raw data for transactions in the non-relational database include a source account identifier, a transaction direction, a target account identifier, and a transaction identifier.

13. The non-transitory computer-readable medium of claim 10, wherein the raw data stored in the non-relational database includes one or more types of the following types of raw data: transaction, account, and linking.

14. The non-transitory computer-readable medium of claim 10, wherein performing the bulk upsert is performed without interrupting current requests for raw data stored in the non-relational database from one or more computing devices, wherein the bulk upsert is performed on a daily basis.

15. The non-transitory computer-readable medium of claim 10, wherein row keys of rows storing raw data for accounts in the non-relational database include an account identifier, and wherein row keys of rows storing raw linking data in the non-relational database include a source account identifier and a target account identifier.

16. A system, comprising
at least one processor; and
a memory having instructions stored thereon that are executable by the at least one processor to cause the system to:
  receive, from a computing device, a request for raw data specifying a start timestamp and an end timestamp;
  determine a start key and an end key for performing a query on a distributed non-relational database storing key-value pairs, wherein determining the start key and the end key is based on the start timestamp and the end timestamp;
  compare the start key and the end key to a sort key included in row keys of key-value pairs stored in the non-relational database;
  retrieve, based on the comparing, one or more rows of raw data from the non-relational database; and
  generate a graphical representation of the one or more rows of raw data retrieved from the non-relational database; and
  perform a bulk update of the raw data, wherein the bulk update includes altering a duplicate set of records included in the raw data by switching a source identifier and a target identifier associated with respective records in the duplicate set of records.

17. The system of claim 16, wherein sort keys included in the row keys of the key-value pairs include transaction initiation timestamps.

18. The system of claim 16, wherein row keys of key-value pairs storing raw data for transactions in the non-relational database include a source account identifier, a transaction direction, a target account identifier, and a transaction identifier.

19. The system of claim 16, wherein row keys of rows storing raw data for accounts in the non-relational database include an account identifier, and wherein row keys of rows storing raw linking data in the non-relational database include a source account identifier and a target account identifier.

20. The system of claim 16, wherein the duplicate set of records include transaction records, and wherein switching the source identifier and the target identifier includes switching a source account identifier and a target account identifier, and wherein the bulk update is performed on an hourly basis.

* * * * *